US012762672B2

(12) United States Patent
Lin et al.

(10) Patent No.: US 12,762,672 B2
(45) Date of Patent: Oct. 13, 2026

(54) SYSTEM AND METHOD FOR CALIBRATING DISTORTED DISPLAY DATA FOR A DISPLAY

(71) Applicant: Kunshan Yunyinggu Electronic Technology Co., Ltd., Kunshan (CN)

(72) Inventors: Yaoming Lin, Kunshan (CN); Daolin Shi, Kunshan (CN)

(73) Assignee: Kunshan Yunyinggu Electronic Technology Co., Ltd., Kunshan (CN)

( * ) Notice: Subject to any disclaimer, the term of this patent is extended or adjusted under 35 U.S.C. 154(b) by 433 days.

(21) Appl. No.: 18/385,479

(22) Filed: Oct. 31, 2023

(65) Prior Publication Data

US 2025/0131542 A1 Apr. 24, 2025

Related U.S. Application Data

(63) Continuation of application No. PCT/CN2023/125625, filed on Oct. 20, 2023.

(51) Int. Cl.

| | |
|---|---|
| ***G06T 5/80*** | (2024.01) |
| ***G06T 3/02*** | (2024.01) |
| ***G06T 3/4007*** | (2024.01) |
| ***G06T 5/20*** | (2006.01) |

(52) U.S. Cl.

CPC .................. *G06T 5/80* (2024.01); *G06T 3/02* (2024.01); *G06T 3/4007* (2013.01); *G06T 5/20* (2013.01)

(58) Field of Classification Search
None
See application file for complete search history.

(56) References Cited

U.S. PATENT DOCUMENTS 9,305,592 B1 * 4/2016 Lee .................... G11B 7/00772
2016/0105630 A1 * 4/2016 Schaffer .................... G06T 3/18 348/231.99

OTHER PUBLICATIONS

Abdulsattar, Fatimah; A New Adaptive Filter for Eliminating Salt and Pepper Noise; Jul. 2020; 2nd International Scientific Conference on AI-Ayen University; vol. 928; p. 1-9; https://iopscience.iop.org/article/10.1088/1757-899X/938/4/043002/pdf (Year: 2020).*

* cited by examiner

*Primary Examiner* — Joni Hsu
(74) *Attorney, Agent, or Firm* — Bayes PLLC

(57) ABSTRACT

A system including a display and a processor is provided. The display includes a plurality of pixels, and at least part of the pixels is distorted. The processor is configured to calibrate a distorted pixel by obtaining a coordinate position of the distorted pixel after distortion, obtaining at least one distortion scale parameter of the distorted pixel, determining a calibrating window centered at the distorted pixel based on the at least one distortion scale parameter, calculating at least one greyscale value of at least one simulated pixel based on the at least one pixel within the calibrating window and the at least one distortion scale parameter, and calculating a calibrated greyscale value of the distorted pixel based on the greyscale value of the at least one simulated pixel.

20 Claims, 12 Drawing Sheets

1000

100

1000

SYSTEM AND METHOD FOR CALIBRATING DISTORTED DISPLAY DATA FOR A DISPLAY

CROSS-REFERENCE TO RELATED APPLICATIONS

This application is a continuation of International Application No. PCT/CN2023/125625, filed on Oct. 20, 2023, which is incorporated herein by reference in its entirety.

BACKGROUND

The disclosure relates generally to display technologies, and more particularly, to a system and a method for calibrating a display.

The distance between wearable devices and the user's eyes is much closer compared with the distance between other electrical devices such as cell phones, computers, and TVs. Thus, distortions are generated on the display panel of the wearable devices due to the physical structure of the wearable device and human eye perception when using the wearable device. To counteract the distortions, active reverse distortions are generally employed on the input images of the wearable devices. For high-resolution wearable devices, pixels in the peripheral area of input images are compressed to reduce data amount during data transmission thereby improving transmission efficiency. The compressed pixels need to be reconstructed to restore the original resolution before compression after being received by the display panel using linear interpolation. However, in the distorted region, obvious jaggies will be produced in a reconstructed image by the use of linear interpolation due to distortion.

SUMMARY

The disclosure relates generally to display technologies, and more particularly, to a system and a method for calibrating a display.

In one example, a system for display is provided. The system includes a display and a processor. The display has a plurality of pixels, and at least part of the pixels is distorted. The processor is configured to calibrate a distorted pixel by obtaining a coordinate position of the distorted pixel after distortion, obtaining at least one distortion scale parameter of the distorted pixel, and determining a calibrating window centered at the distorted pixel based on the at least one distortion scale parameter. The calibrating window includes at least one pixel located along at least one distorted direction. The processor is further configured to calculate at least one calibrated greyscale value of the at least one simulated pixel based on the at least one pixel within the calibrating window and the at least one distortion scale parameter. The processor is further configured to calculate a calibrated greyscale value of the distorted pixel based on the calibrated greyscale value of the of the at least one of simulated pixel.

In one implementation, the at least one distortion scale parameter includes a first scale HS and a first rotate scale HrS. The first scale HS is configured to illustrate a change in distance between the distorted pixel and a first pixel adjacent to the distorted pixel in a first direction. The first rotate scale HrS configured to illustrate a change in orientation between the distorted pixel and the first pixel after distortion.

In one implementation, a coordinate position of the distorted pixel after distortion is $(x_0, y_0)$, a coordinate position of the first pixel after distortion is $(x_1, y_1)$. The first scale HS is calculated by $HS = x_1 - x_0$, and the first rotate scale HrS is calculated by $HrS = y_1 - y_0$.

In one implementation, the system further includes a memory configured to store a look-up table. The look-up table is configured to store the first scale HS and the first rotate scale HrS of each distorted pixel.

In one implementation, for each distorted frame input into the display, the first scale HS and the first rotate scale HrS of each distorted pixel are extracted from the look-up table.

In one implementation, the calibrating window includes a first scope H extending along the first direction, and $H = k_1 \times HS \times M + 1$, where $k_1$ is a first calibrating coefficient, and M is a downscale unit of distortion of the distorted pixel along the first direction.

In one implementation, $k_1 = 2$.

In one implementation, calculating the at least one calibrated greyscale value of the at least one simulated pixel within the calibrating window includes calculating a coordinate position of the at least one simulated pixel along the first direction within the first scope H by $x_1 = x_0 + i$, $y_i = y_0 + i \times HrS$. $(x_i, y_{i1})$ is the coordinate position of an ith simulated pixel within the first scope H, and i is an integer other than 0.

In one implementation, calculating the at least one calibrated greyscale value for the at least one simulated pixel within the calibrating window includes processing linear interpolation based on greyscale values of the at least one distorted pixel adjacent to the simulated pixel. A distance between the simulated pixel and the pixel adjacent to the simulated pixel is less than 1.

In one implementation, the greyscale value of the distorted pixel is calculated based on the at least one calibrated greyscale value of the at least one simulated pixel along the first direction within the first scope H.

In one implementation, the greyscale value of the distorted pixel is an average of the at least one calibrated greyscale value of the at least one simulated pixel along the first direction within the first scope H.

In one implementation, the at least one distortion scale parameter includes a second scale VS and a second rotate scale VrS. The second scale VS is configured to illustrate a change in distance between the distorted pixel and a second pixel adjacent to the distorted pixel in a second direction. The second rotate scale VrS is configured to illustrate a change in orientation between the distorted pixel and the second pixel.

In one implementation, a coordinate position of the distorted pixel after distortion is $(x_0, y_0)$, a coordinate position of the second pixel after distortion is $(x_2, y_2)$. The second scale VS is calculated by $VS = x_2 - x_0$, the second rotate scale VrS is calculated by $VrS = y_2 - y_0$.

In one implementation, the system further includes a memory configured to store a look-up table. The look-up table is configured to store the second scale HS and the second rotate scale HrS of each distorted pixel.

In one implementation, for each distorted frame input into the display, the second scale VS and the second rotate scale VrS of each distorted pixel are extracted from the look-up table.

In one implementation, the calibrating window includes a second scope V extending along the second direction, and $V = k_2 \times VS \times N + 1$. $k_2$ is a second calibrating coefficient, and N is a downscale unit of distortion of the distorted pixel along the second direction.

In one implementation, $k_2=2$.

In one implementation, calculating the at least one greyscale value of the at least one simulated pixel within the calibrating window includes calculating a coordinate position of the at least one simulated pixel along the second direction within the second scope V by $x_j=x_0+j$, $y_j=y_0+j\times VrS$, where $(x_j, x_j)$ is the calibrated coordinate position of a jth simulated pixel within the second scope V, and j is an integer other than 0.

In one implementation, calculating the at least one calibrated greyscale value of the at least one simulated pixel within the calibrating window includes processing linear interpolation based on greyscale values of at least one distorted pixel adjacent to the simulated pixel. A distance between the simulated pixel and the pixel adjacent to the simulated pixel is less than 1.

In one implementation, the greyscale value of the distorted pixel is calculated based on the at least one calibrated greyscale value of the at least one simulated pixel along the second direction within the second scope V.

In one implementation, the greyscale value of the distorted pixel is an average of the at least one greyscale value of the at least one simulated pixel along the second direction within the second scope V.

In one implementation, the display is a near-to-eye display.

In one implementation, the distorted pixels are distributed in a non-focused region of the display.

In another example, a method for calibrating a display is provided. The display has a plurality of pixels, and at least part of the pixel data is distorted. The method includes obtaining a coordinate position of a distorted pixel after distortion, obtaining at least one distortion scale parameter of the distorted pixel, and determining a calibrating window centered at the distorted pixel based on the at least one distortion scale parameter. The calibrating window includes at least one pixel located along at least one distorted direction. The method further includes calculating at least one greyscale value for at least one simulated pixel based on the distorted pixel within the calibrating window and the at least one distortion scale parameter. The method further includes calculating a calibrated greyscale value of the distorted pixel based on the greyscale value of the of the at least one simulated pixel data.

In one implementation, the at least one distortion scale parameter includes a first scale HS and a first rotate scale HrS. The first scale HS is configured to illustrate a change in distance between the distorted pixel and a first pixel adjacent to the distorted pixel in a first direction after distortion. The first rotate scale HrS is configured to illustrate a change in orientation between the distorted pixel and the first pixel after distortion.

In one implementation, a coordinate position of the distorted pixel after distortion is $(x_0, y_0)$, a coordinate position of the first pixel after distortion is $(x_1, y_1)$. The first scale HS is calculated by $HS=x_1-x_0$, and the first rotate scale HrS is calculated by $HrS=y_1-y_0$.

In one implementation, the method further includes storing the first scale HS and the first rotate scale HrS of each distorted pixel in a look-up table.

In one implementation, for each distorted frame input into the display, the first scale HS and the first rotate scale HrS of each distorted pixel are extracted from the look-up table.

In one implementation, the calibrating window includes a first scope H extending along the first direction, and $H=k_1\times HS\times M+1$, $k_1$ is a first calibrating coefficient, and M is a downscale unit of distortion of the distorted pixel along the first direction.

In one implementation, $k_1=2$.

In one implementation, calculating the at least one greyscale value of the at least one simulated pixel within the calibrating window includes calculating a calibrated coordinate position of the at least one simulated pixel along the first direction within the first scope H by $x_i=x_0+i$, $y_i=y_0+i\times HrS$, where $(x_i, y_i)$ is the calibrated coordinate position of an ith simulated pixel within the first scope H, and i is an integer other than 0.

In one implementation, calculating the at least one greyscale value of the at least one simulated pixel within the calibrating window includes processing linear interpolation based on greyscale values of at least one distorted pixel adjacent to the simulated pixel. A distance between the simulated pixel and the pixel adjacent to the simulated pixel is less than 1.

In one implementation, the greyscale value of the distorted pixel is calculated based on the at least one greyscale value of the at least one simulated pixel along the first direction within the first scope H.

In one implementation, the greyscale value of the distorted pixel is an average of the at least one greyscale value of the at least one simulated pixel along the first direction within the first scope H.

In one implementation, the at least one distortion scale parameter includes a second scale VS configured to illustrate a change in distance between the distorted pixel and a second pixel adjacent to the distorted pixel data in a second direction, and a second rotate scale VrS configured to illustrate a change in orientation between the distorted pixel and the second pixel.

In one implementation, a coordinate position of the distorted pixel after distortion is $(x_0, y_0)$, a coordinate position of the second pixel after distortion is $(x_2, y_2)$. The second scale VS is calculated by $VS=x_2-x_0$, and the second rotate scale VrS is calculated by $VrS=y_2-y_0$.

In one implementation, the method further includes storing a look-up table in a memory. The look-up table is configured to store the second scale HS and the second rotate scale HrS of each distorted pixel.

In one implementation, for each distorted frame input into the display, the second scale VS and the second rotate scale VrS of each distorted pixel are extracted from the look-up table.

In one implementation, the calibrating window includes a second scope V extending along the second direction, and $V=k_2\times VS\times N+1$, $k_2$ is a second calibrating coefficient, and N is a downscale unit of distortion of the distorted pixel along the second direction.

In one implementation, $k_2=2$.

In one implementation, calculating the at least one calibrated greyscale value of at least one simulated pixel within the calibrating window includes calculating a coordinate position of a simulated pixel data along the second direction within the second scope V by $x_j=x_0+j$, $y_j=y_0+j\times VrS$, where $(x_j, x_j)$ is the coordinate position of a jth simulated pixel within the second scope V, and j is an integer other than 0.

In one implementation, calculating the at least one greyscale value for the at least one simulated pixel within the calibrating window includes processing linear interpolation based on greyscale values of at least one distorted pixel adjacent to the simulated pixel. A distance between the simulated pixel and the pixel adjacent to the simulated pixel is less than 1.

In one implementation, the greyscale value of the distorted pixel is calculated based on the at least one greyscale value of the at least one simulated pixel along the second direction within the second scope V.

In one implementation, the greyscale value of the distorted pixel is an average of the at least one greyscale value of the at least one simulated pixel along the second direction within the second scope V.

DETAILED DESCRIPTION

In the following detailed description, numerous specific details are set forth by way of examples in order to provide a thorough understanding of the relevant disclosures. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1A:
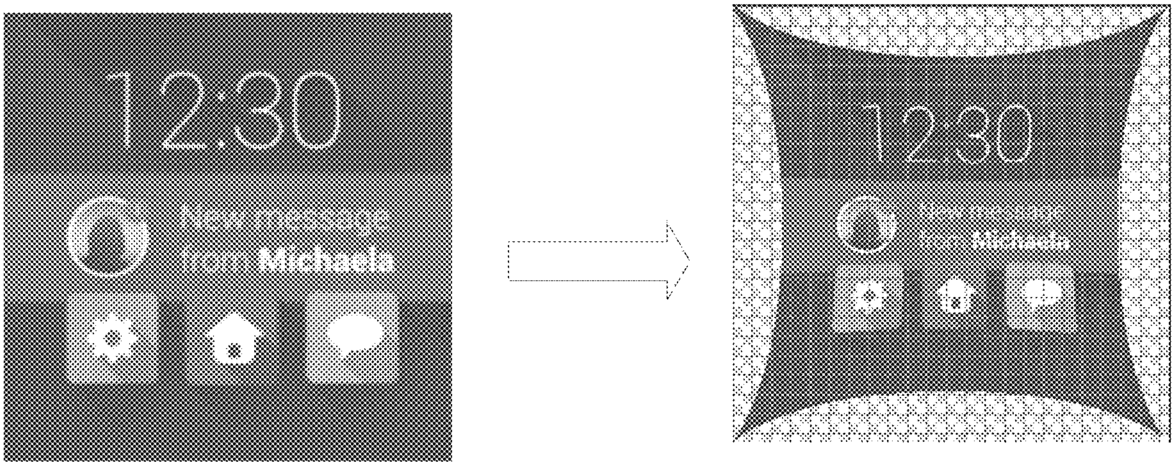
FIG. 1A illustrates an exemplary picture on a display panel of a wearable device and a corresponding picture seen by a user in accordance with an embodiment.

The distance between wearable devices and the user's eyes is much closer compared with the distance between other electrical devices such as cell phones, computers, and TVs. Thus, distortions are generated on the display panel of the wearable devices due to the physical structure of the wearable device and human eye perception when using the wearable device. A figure on the left side of FIG. 1A is a picture is shown in a display panel of a wearable device, and a figure on the right side of FIG. 1A is a corresponding picture seen by the user, which is seriously distorted due to the small distance between the wearable device and the user's eyes. To counteract the distortions, active reverse distortions are generally employed on the input images of the wearable devices. As shown in a figure on the left side of FIG. 1B, the picture shown in the display panel is reversely distorted against the distortion shown in FIG. 1A, thus, the picture seen by the user is normal without distortion, as shown in a figure on the right side of FIG. 1B.

For high-resolution wearable devices, such as 4K/8K devices, pixels in peripheral area of input images are compressed to reduce data amount during data transmission thereby improving transmission efficiency. The compressed pixels need to be reconstructed to restore the original resolution before compression after being received by the display panel using linear interpolation. However, in the distorted region, obvious jaggies will be produced in the image by the use of linear interpolation, impairing the display effect, as shown in FIG. 1C. Some wearable devices employ Gaussian processing on the input images to blur the jaggies, but the jaggies still cannot be eliminated at the sacrifice of picture clarity, as shown in FIG. 1D.

Figure 2A:
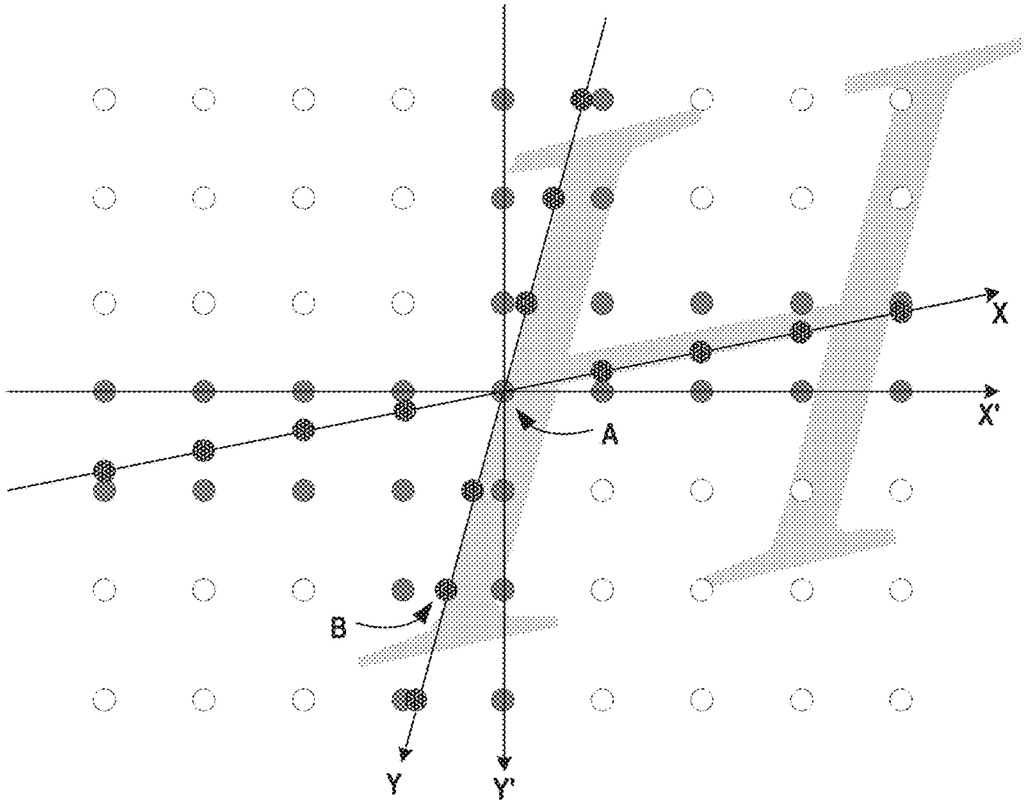
FIG. 2A illustrates a calibration map of a distorted picture in accordance with an embodiment.
Figure 2B:
FIG. 2B illustrates a distorted picture on a display panel calibrated by the calibration map of FIG. 22A in accordance with an embodiment.

To solve the above problem, a system and method for calibrating a display are provided by the present disclosure. At least one distortion scale parameter is employed to illustrate changes in distance and orientation between the distorted pixel data and pixel data adjacent to the distorted pixel data in at least one direction. As shown in FIG. 2A, a plurality of simulated pixels B are calculated to illustrate the distortion degree of a distorted pixel A. For example, a first calibrated direction X is generated to show the distortion degree along a first direction X', and a first group of simulated pixels B are disposed along the first calibrated direction X. A second calibrated direction Y is generated to show the distortion degree along a second direction Y', a second group of simulated pixels B are disposed along the second calibrated direction Y. The first direction X' is perpendicular to the second direction Y', and the first calibrated direction X and the second calibrated direction Y are consistent with the distorted image. The distorted pixel A is calibrated based on the greyscale value of the simulated pixels B. As shown in FIG. 2A, the degree and orientation of the distorted image are accurately calculated by the simulated pixels. FIG. 2B shows a calibrated image processed using the system and method provided by the present disclosure, it can be shown that the jaggies on the image are eliminated.

Additional novel features will be set forth in part in the description which follows, and in part will become apparent to those skilled in the art upon examination of the following and the accompanying drawings or may be learned by the production or operation of the examples. The novel features of the present disclosure may be realized and attained by practice or use of various aspects of the methodologies, instrumentalities, and combinations set forth in the detailed examples discussed below.

For ease of description, as used herein, “data”, “a piece of data”, or the like refers to a set of data (e.g., compensation data or display data) that can include one or more values. In the present disclosure, for example, “pixel data” or “a piece of pixel data” refers to any number of values used for compensating one pixel. The pixel data may include at least one value each for compensating a subpixel. When a piece of data includes a single value, the “piece of data” and “value” are interchangeable. The specific number of values included in a piece of data should not be limited.

Figure 3:
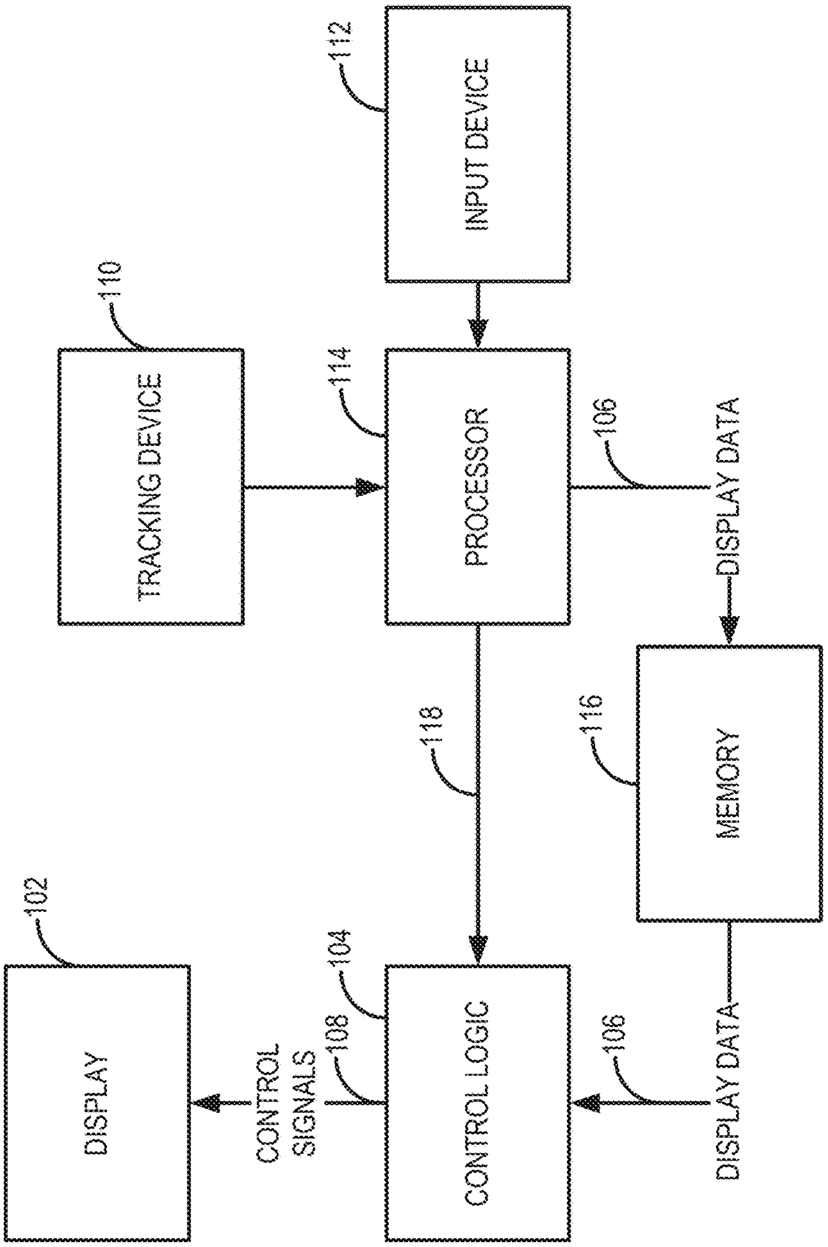
FIG. 3 is a block diagram illustrating an apparatus including a display and control logic in accordance with an embodiment.

FIG. 3 illustrates an apparatus 100 including a display 102 and control logic 104. Apparatus 100 may be any suitable device, for example, a VR/AR device (e.g., VR headset, etc.), handheld device (e.g., dumb or smart phone, tablet, etc.), wearable device (e.g., eyeglasses, wrist watch, etc.), automobile control station, gaming console, television set, laptop computer, desktop computer, netbook computer, media center, set-top box, global positioning system (GPS), electronic billboard, electronic sign, printer, or any other suitable device. In this embodiment, display 102 is operatively coupled to control logic 104 and is part of apparatus 100, such as but not limited to, a head-mounted display, computer monitor, television screen, dashboard, electronic billboard, or electronic sign. Display 102 may be an OLED display, liquid crystal display (LCD), E-ink display, electroluminescent display (ELD), billboard display with LED or incandescent lamps, or any other suitable type of display.

Control logic 104 may be any suitable hardware, software, firmware, or a combination thereof, configured to receive display data 106 (e.g., pixel data and compensation data) and generate control signals 108 for driving the subpixels on display 102. Control signals 108 are used for controlling the writing of display data to the subpixels and directing operations of display 102. For example, subpixel rendering algorithms for various subpixel arrangements may be part of control logic 104 or implemented by control logic 104. Control logic 104 may include any other suitable components, such as an encoder, a decoder, one or more processors, controllers, and storage devices. Control logic 104 may be implemented as a standalone integrated circuit (IC) chip, such as an application-specific integrated circuit (ASIC) or a field-programmable gate array (FPGA). Apparatus 100 may also include any other suitable component such as, but not limited to tracking devices 110 (e.g., inertial sensors, camera, eye tracker, GPS, or any other suitable devices for tracking motion of eyeballs, facial expression, head motion, body motion, and hand gesture) and input devices 112 (e.g., a mouse, keyboard, remote controller, handwriting device, microphone, scanner, etc.).

In this embodiment, apparatus 100 may be a handheld or a VR/AR device, such as a smart phone, a tablet, or a VR headset. Apparatus 100 may also include a processor 114 and memory 116. Processor 114 may be, for example, a graphics processor (e.g., graphics processing unit (GPU)), an application processor (AP), a general processor (e.g., APU, accelerated processing unit; GPGPU, general-purpose computing on GPU), or any other suitable processor. Memory 116 may be, for example, a discrete frame buffer or a unified memory. Processor 114 is configured to generate display data 106 in display frames and may temporally store display data 106 in memory 116 before sending it to control logic 104. Processor 114 may also generate other data, such as but not limited to, control instructions 118 or test signals, and provide them to control logic 104 directly or through memory 116. Control logic 104 then receives display data 106 from memory 116 or from processor 114 directly. In some embodiments, no control instructions 118 is directly transmitted from processor 114 to control logic 104. In some embodiments, compensation data transmitted from processor 114 to memory 116 and/or from memory 116 to control logic 104 may be compressed.

In some embodiments, control logic 104 is part of apparatus 100, processor 114 is part of an external device of apparatus 100, and memory 116 is an external storage device that is used to store data computed by processor 114. The data stored in processor 114 may be inputted into control logic 104 for further processing. In some embodiments, no control instructions 118 is transmitted from processor 114 to control logic 104. For example, apparatus 100 may be a smart phone or tablet, and control logic 104 may be part of apparatus 100. Processor 114 may be part of an external computer that is different from apparatus 100/control logic 104. Display data 106 may include any suitable data computed by and transmitted from processor 114 to control logic 104. For example, display data may include compressed compensation data. In some embodiments, display data 106 includes no pixel data. Memory 116 may include a flash drive that stores the compressed compensation data processed by processor 114. Memory 116 may be coupled to control logic 104 to input the compressed compensation data into apparatus 100 such that control logic 104 can decompress the compressed compensation data and generate corresponding control signals 108 for display 102.

Figure 4A:
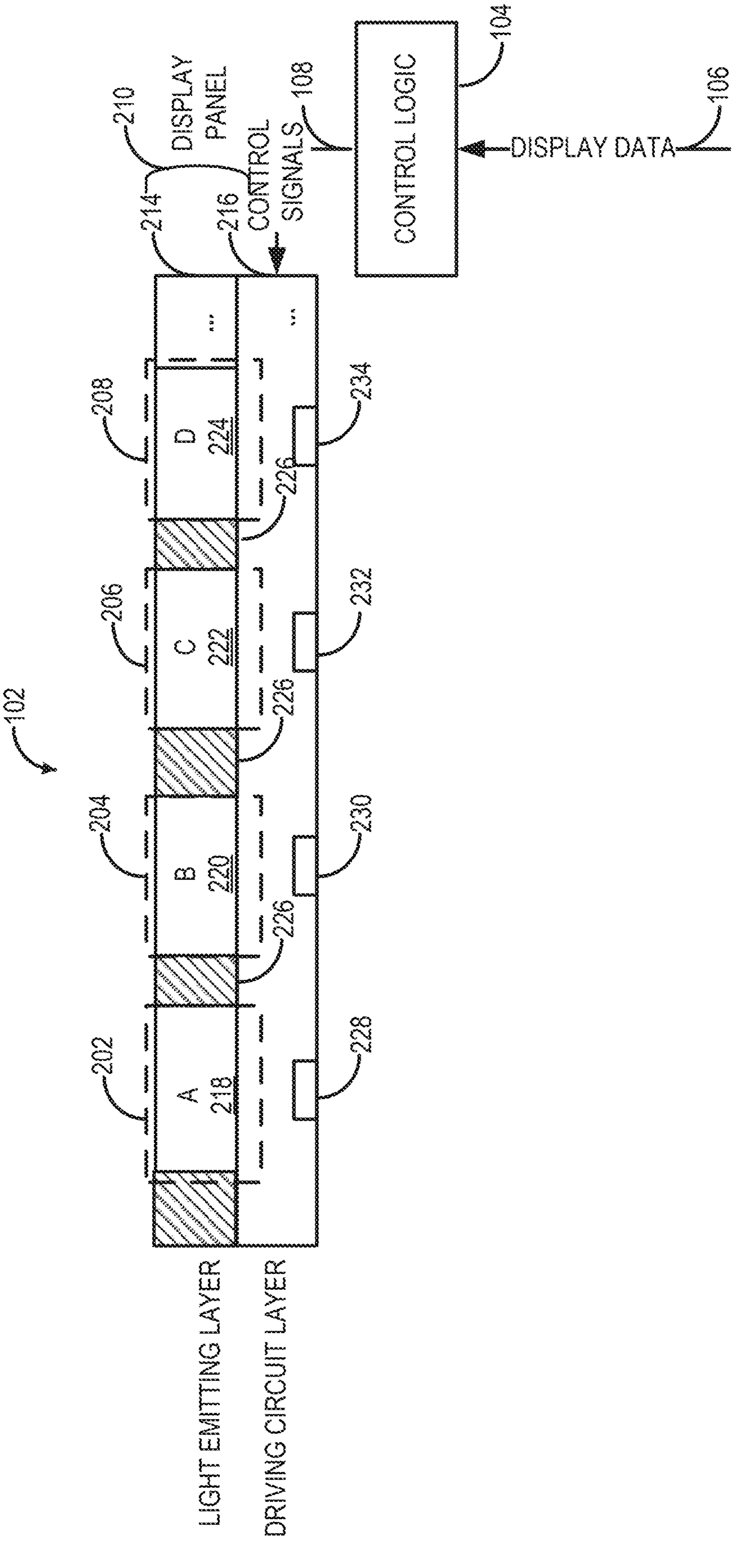
FIGS. 4A-4B are side-view diagrams illustrating various examples of the display shown in FIG. 1 in accordance with various embodiments.

FIG. 4A is a side-view diagram illustrating one example of display 102 including subpixels 202, 204, 206, and 208. Display 102 may be any suitable type of display, for example, OLED displays, such as an active-matrix OLED (AMOLED) display, or any other suitable display. Display 102 may include a display panel 210 operatively coupled to control logic 104. The example shown in FIG. 2A illustrates a side-by-side (a.k.a. lateral emitter) OLED color patterning architecture in which one color of light-emitting material is deposited through a metal shadow mask while the other color areas are blocked by the mask.

In this embodiment, display panel 210 includes a light emitting layer 214 and a driving circuit layer 216. As shown in FIG. 4A, light emitting layer 214 includes a plurality of light emitting elements (e.g., OLEDs) 218, 220, 222, and 224, corresponding to a plurality of subpixels 202, 204, 206, and 208, respectively. A, B, C, and D in FIG. 4A denote OLEDs in different colors, such as but not limited to, red, green, blue, yellow, cyan, magenta, or white. Light emitting layer 214 also includes a black array 226 disposed between OLEDs 218, 220, 222, and 224, as shown in FIG. 4A. Black array 226, as the borders of subpixels 202, 204, 206, and 208, is used for blocking lights coming out from the parts outside OLEDs 218, 220, 222, and 224. Each OLED 218, 220, 222, and 224 in light emitting layer 214 can emit a light in a predetermined color and brightness.

In this embodiment, driving circuit layer 216 includes a plurality of pixel circuits 228, 230, 232, and 234, each of which includes one or more thin film transistors (TFTs), corresponding to OLEDs 218, 220, 222, and 224 of subpixels 202, 204, 206, and 208, respectively. Pixel circuits 228, 230, 232, and 234 may be individually addressed by control signals 108 from control logic 104 and configured to drive corresponding subpixels 202, 204, 206, and 208, by controlling the light emitting from respective OLEDs 218, 220, 222, and 224, according to control signals 108. Driving circuit layer 216 may further include one or more drivers (not shown) formed on the same substrate as pixel circuits 228, 230, 232, and 234. The on-panel drivers may include circuits for controlling light emitting, gate scanning, and data writing as described below in detail. Scan lines and data lines are also formed in driving circuit layer 216 for transmitting scan signals and data signals, respectively, from the drivers to each pixel circuit 228, 230, 232, and 234. Display panel 210 may include any other suitable component, such as one or more glass substrates, polarization layers, or a touch panel (not shown). Pixel circuits 228, 230, 232, and 234 and other components in driving circuit layer 216 in this embodiment are formed on a low temperature polycrystalline silicon (LTPS) layer deposited on a glass substrate, and the TFTs in each pixel circuit 228, 230, 232, and 234 are p-type transistors (e.g., PMOS LTPS-TFTs). In some embodiments, the components in driving circuit layer 216 may be formed on an amorphous silicon (a-Si) layer, and the TFTs in each pixel circuit may be n-type transistors (e.g., NMOS TFTs). In some embodiments, the TFTs in each pixel circuit may be organic TFTs (OTFT) or indium gallium zinc oxide (IGZO) TFTs.

As shown in FIG. 4A, each subpixel 202, 204, 206, and 208 is formed by at least an OLED 218, 220, 222, and 224 driven by a corresponding pixel circuit 228, 230, 232, and 234. Each OLED may be formed by a sandwich structure of an anode, an organic light-emitting layer, and a cathode. Depending on the characteristics (e.g., material, structure, etc.) of the organic light-emitting layer of the respective OLED, a subpixel may present a distinct color and brightness. Each OLED 218, 220, 222, and 224 in this embodiment is a top-emitting OLED. In some embodiments, the OLED may be in a different configuration, such as a bottom-emitting OLED. In one example, one pixel may consist of three adjacent subpixels, such as subpixels in the three primary colors (red, green, and blue) to present a full color. In another example, one pixel may consist of four adjacent subpixels, such as subpixels in the three primary colors (red, green, and blue) and the white color. In still another example, one pixel may consist of two adjacent subpixels. For example, subpixels A 202 and B 204 may constitute one pixel, and subpixels C 206 and D 208 may constitute another pixel. Here, since the display data 106 is usually programmed at the pixel level, the two subpixels of each pixel or the multiple subpixels of several adjacent pixels may be addressed collectively by subpixel rendering to present the appropriate brightness and color of each pixel, as designated in display data 106 (e.g., pixel data). However, it is to be appreciated that, in some embodiments, display data 106 may be programmed at the subpixel level such that display data 106 can directly address individual subpixel without subpixel rendering. Because it usually requires three primary colors (red, green, and blue) to present a full color, specifically designed subpixel arrangements may be provided for display 102 in conjunction with subpixel rendering algorithms to achieve an appropriate apparent color resolution. In some embodiments, the resolution of each of red, green, and blue colors is equal to one another. In other embodiments, the resolution of red, green, and blue colors may not all be the same.

Figure 4B:
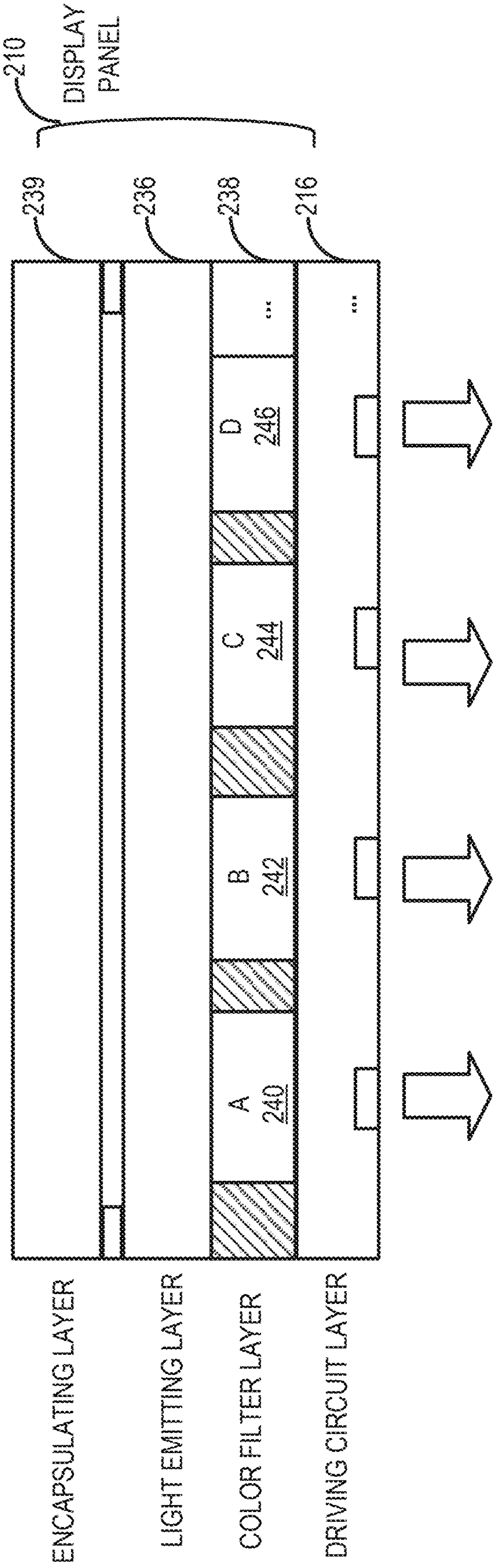

The example shown in FIG. 4A illustrates a side-by-side patterning architecture in which one color of light-emitting material is deposited through the metal shadow mask while the other color areas are blocked by the mask. In another example, a white OLEDs with color filters (WOLED+CF) patterning architecture can be applied to display panel 210. In the WOLED+CF architecture, a stack of light-emitting materials form a light emitting layer of white light. The color of each individual subpixel is defined by another layer of color filters in different colors. As the organic light-emitting materials do not need to be patterned through the metal shadow mask, the resolution and display size can be increased by the WOLED+CF patterning architecture. FIG. 4B illustrates an example of a WOLED+CF patterning architecture applied to display panel 210. Display panel 210 in this embodiment includes driving circuit layer 216, a light emitting layer 236, a color filter layer 238, and an encapsulating layer 239. In this example, light emitting layer 236 includes a stack of light emitting sub-layers and emits white light. Color filter layer 238 may be comprised of a color filter array having a plurality of color filters 240, 242, 244, and 246 corresponding to subpixels 202, 204, 206, and 208, respectively. A, B, C, and D in FIG. 4B denote four different colors of filters, such as but not limited to, red, green, blue, yellow, cyan, magenta, or white. Color filters 240, 242, 244, and 246 may be formed of a resin film in which dyes or pigments having the desired color are contained. Depending on the characteristics (e.g., color, thickness, etc.) of the respective color filter, a subpixel may present a distinct color and brightness. Encapsulating layer 239 may include an encapsulating glass substrate or a substrate fabricated by the thin film encapsulation (TFE) technology. Driving circuit layer 216 may be comprised of an array of pixel circuits including LTPS, IGZO, or OTFT transistors. Display panel 210 may include any other suitable components, such as polarization layers, or a touch panel (not shown).

Figure 5:
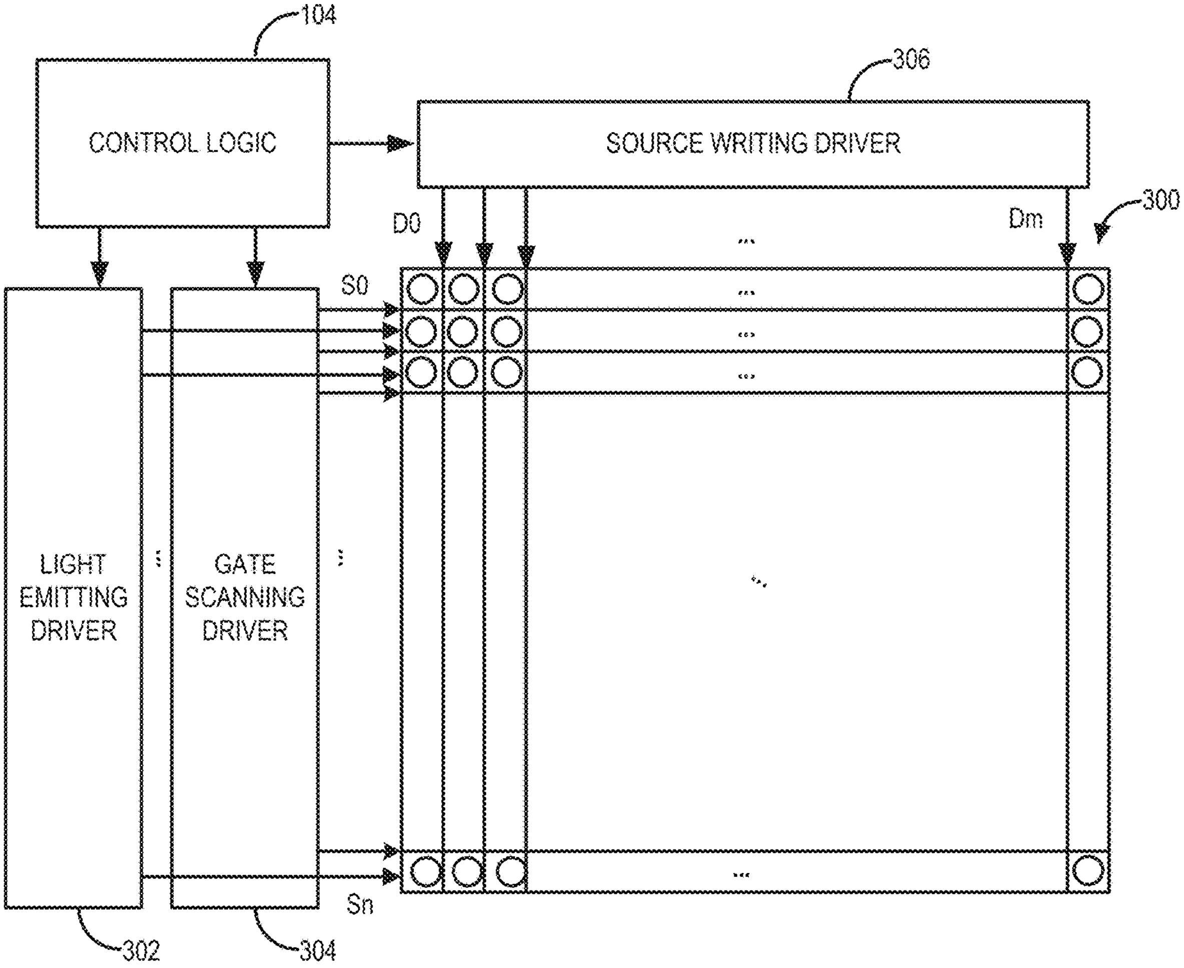
FIG. 5 is a plan-view diagram illustrating the display shown in FIG. 3 including multiple drivers in accordance with an embodiment.

FIG. 5 is a plan-view diagram illustrating display 102 shown in FIG. 3 including multiple drivers in accordance with an embodiment. Display panel 210 in this embodiment includes an array of subpixels 300 (e.g., OLEDs), a plurality of pixel circuits (not shown), and multiple on-panel drivers including a light emitting driver 302, a gate scanning driver 304, and a source writing driver 306. The pixel circuits are operatively coupled to array of subpixels 300 and on-panel drivers 302, 304, and 306. Light emitting driver 302 in this embodiment is configured to cause array of subpixels 300 to emit lights in each frame. It is to be appreciated that although one light emitting driver 302 is illustrated in FIG. 5, in some embodiments, multiple light emitting drivers may work in conjunction with each other.

Gate scanning driver 304 in this embodiment applies a plurality of scan signals S0-Sn, which are generated based on control signals 108 from control logic 104, to the scan lines (a.k.a. gate lines) for each row of subpixels in array of subpixels 300 in a sequence. The scan signals S0-Sn are applied to the gate electrode of a switching transistor of each pixel circuit during the scan/charging period to turn on the switching transistor so that the data signal for the corresponding subpixel can be written by source writing driver 306. As will be described below in detail, the sequence of applying the scan signals to each row of array of subpixels 300 (i.e., the gate scanning order) may vary in different embodiments. In some embodiments, not all the rows of subpixels are scanned in each frame. It is to be appreciated that although one gate scanning driver 304 is illustrated in FIG. 5, in some embodiments, multiple gate scanning drivers may work in conjunction with each other to scan array of subpixels 300.

Source writing driver 306 in this embodiment is configured to write display data received from control logic 104 into array of subpixels 300 in each frame. For example, source writing driver 306 may simultaneously apply data signals DO-Dm to the data lines (a.k.a. source lines) for each column of subpixels. That is, source writing driver 306 may include one or more shift registers, digital-analog converter (DAC), multiplexers (MUX), and arithmetic circuit for controlling the timing of application of voltage to the source electrode of the switching transistor of each pixel circuit (i.e., during the scan/charging period in each frame) and a magnitude of the applied voltage according to gradations of display data 106. It is to be appreciated that although one source writing driver 306 is illustrated in FIG. 5, in some embodiments, multiple source writing drivers may work in conjunction with each other to apply the data signals to the data lines for each column of subpixels.

As described above, the system and method for calibrating a display panel may be performed by processor 114 or control logic 104. Processor 114 may be any processor that can generate display data 106, e.g., pixel data, in each frame and provide display data 106 to control logic 104. Processor 114 may be, for example, a GPU, AP, APU, or GPGPU. Control logic 104 may receive other data, such as but not limited to, control instructions 118 (optional in FIG. 1) or test signals (not shown in FIG. 4A) generated by processor 114. The stream of display data 106 transmitted from processor 114 to control logic 104 may include original display data and/or compensation data for pixels on display panel 210. For a wearable device, As described above, processor 114 may be any processor that can generate display data 106, e.g., pixel data and/or compensation data, in each frame and provide display data 106 to control logic 104. Processor 114 may be, for example, a GPU, AP, APU, or GPGPU. Processor 114 may also generate other data, such as but not limited to, control instructions 118 (optional in FIG. 1) or test signals (not shown in FIG. 4A) and provide them to control logic 104. The stream of display data 106 transmitted from processor 114 to control logic 104 may include original display data and/or compensation data for pixels on display panel 210. In the present embodiment, the calibration is performed by processor 114. In other embodiments of the present disclosure, the calibration may be performed by control logic 104, or a processor independent from the display system. The description of the embodiments should not be explained as limitations of the present disclosure.

Processor 114 is configured to calibrate distorted pixel data by obtaining a coordinate position of the distorted pixel data and obtaining at least one distortion scale parameter of the distorted pixel data. A calibrating window centered at the distorted pixel data is then determined based on at least one distortion scale parameter, the calibrating window comprising a plurality of pixel data located along at least one distorted direction. Then a calibrated greyscale value for at least one simulated pixel data is calculated based on the plurality of pixel data within the calibrating window and the at least one distortion scale parameter. Then a calibrated greyscale value of the distorted pixel data is calculated based on the calibrated greyscale value of the at least one of the simulated pixel data.

Figure 1B:
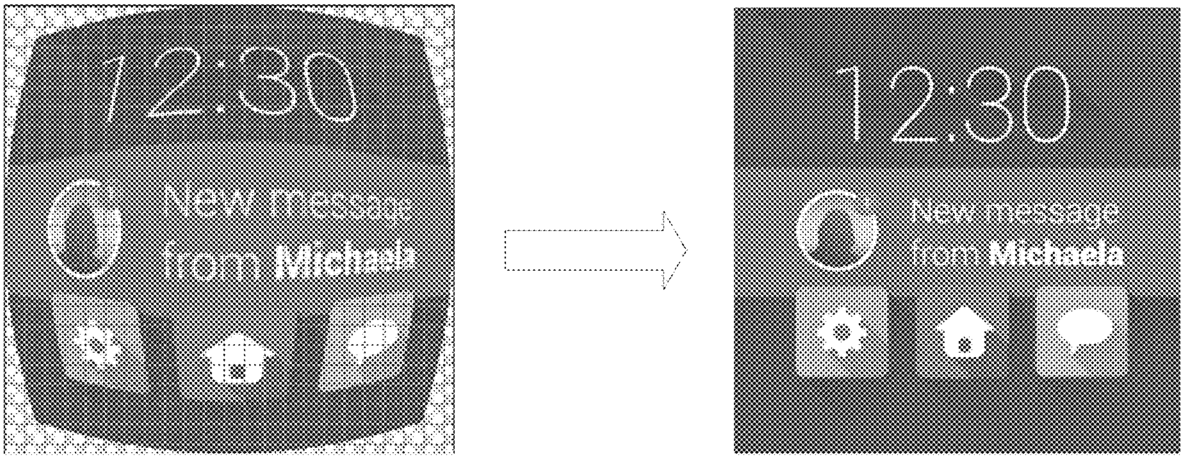
FIG. 1B illustrates an exemplary reversely distorted picture on a display panel of a wearable device and a corresponding picture seen by a user in accordance with an embodiment.
Figure 1C:
FIG. 1C illustrates an exemplary distorted picture on a display panel in accordance with an embodiment.
Figure 1D:
FIG. 1D illustrates a distorted picture on a display panel after calibration in accordance with an embodiment.

Referring to FIG. 1B, each reversely distorted frame input into display 102 includes a plurality of distorted pixels, to simplify the description of the present disclosure, a distorted pixel A is taken as an example in the following description and drawings. It should be understood that the other distorted pixels follow the same processing principle.

Figure 6A:
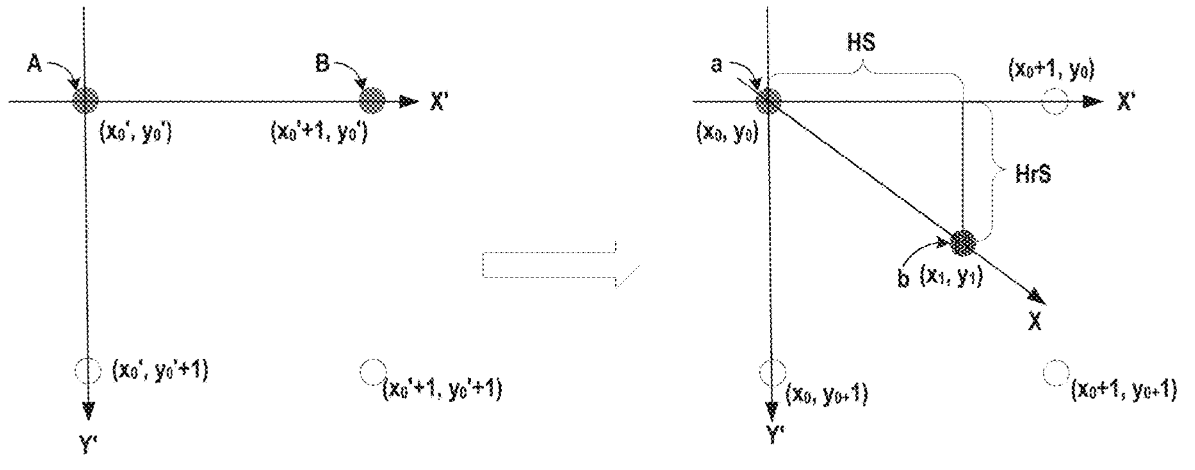
FIG. 6A illustrates a calibration map along a first direction of a distorted picture in accordance with an embodiment.

The at least one distortion scale parameter is configured to represent the changes in distance and orientation along at least one direction centered at the distorted pixel. In the present disclosure, two directions are illustrated. FIG. 6A illustrates a calibration map along a first direction X' of a distorted picture in accordance with an embodiment. When a distorted figure is input into a wearable device, processor 114 may get a distorted coordinate position of each distorted pixel directly. An undistorted coordinate position of each distorted pixel can then be calculated based on the distorted coordinate position and the distortion algorithm. As shown in FIG. 6A, a coordinate position $(x_0, y_0)$ of a distorted pixel a can be obtained by processor 114 from the input distorted figure directly, and a coordinate position $(x_0', y_0')$ of an undistorted pixel A coordinate position can then be calculated based on the coordinate position $(x_0, y_0)$ and the distortion algorithm because each distorted pixel corresponds to an undistorted pixel one by one. A coordinate position $(x_0'+1, y_0')$ of a first pixel B adjacent to pixel A along the first direction X' can be obtained based on the coordinate position $(x_0', y_0')$, because in the pixel map before distortion, a change in distance between any two adjacent pixels is 1 and change in orientation between any two adjacent pixels is 0. A distorted coordinate position $(x_1, y_1)$ of a first simulated distorted pixel b can then be determined based on the coordinate position $(x_0'+1, y_0')$ of first pixel B and the distortion algorithm. A first scale HS is configured to illustrate a distance between distorted pixel a $(x_0, y_0)$ and the first simulated distorted pixel b $(x_1, y_1)$, and a first rotate scale HrS is configured to illustrate a change in orientation between distorted pixel a $(x_0, y_0)$ and the first simulated distorted pixel b $(x_1, y_1)$. For example, as shown in FIG. 6A, the first scale HS may be calculated by $HS=x_1-x_0$, and the first rotate scale HrS may be calculated by $HrS=y_1-y_0$.

Figure 6B:
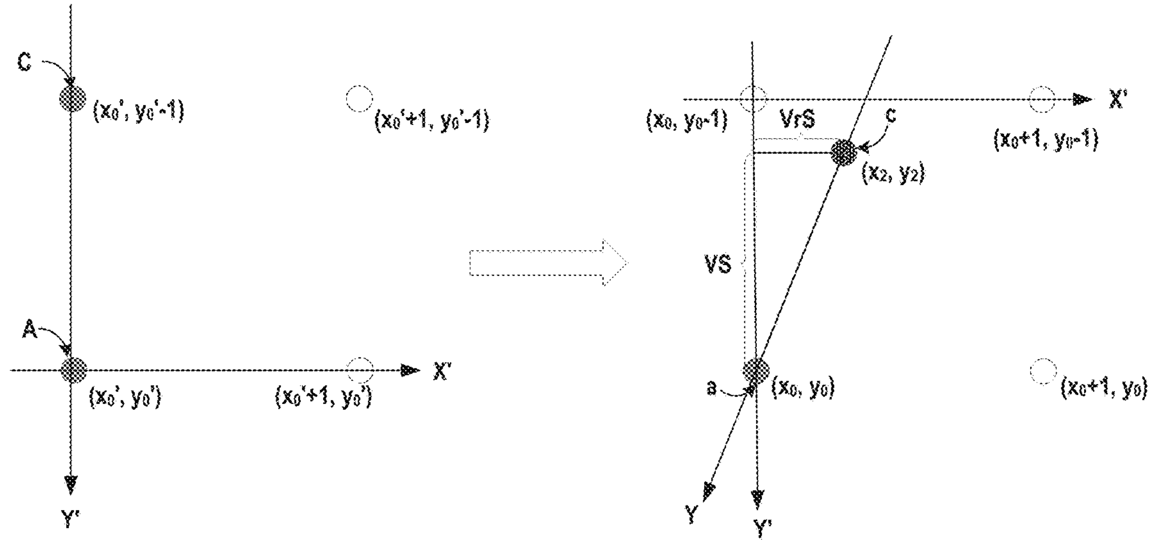
FIG. 6B illustrates the calibration map along a second direction of the distorted picture in accordance with an embodiment.

FIG. 6B illustrates the calibration map along a second direction Y' of the distorted picture in accordance with an embodiment. A left figure of FIG. 6B is a pixel map before distortion and a right figure of FIG. 6B is a pixel map after distortion. As shown in FIG. 6B, a coordinate position $(x_0, y_0)$ of a distorted pixel a can be obtained by processor 114 from the input distorted figure directly, and a coordinate position $(x_0', y_0')$ of an undistorted pixel A coordinate position can then be calculated based on the coordinate position $(x_0, y_0)$ and the distortion algorithm because each distorted pixel corresponds to an undistorted pixel one by one. A coordinate position ($x_0$', $y_0$'−1) of a first pixel C adjacent to pixel A along the second direction Y' can be obtained based on the coordinate position ($x_0$', $y_0$'), because in the pixel map before distortion, a change in distance between any two adjacent pixels is 1 and change in orientation between any two adjacent pixels is 0. A distorted coordinate position ($x_2$, $y_2$) of a second simulated distorted pixel c can then be determined based on the coordinate position ($x_0$', $y_0$'−1) of first pixel B and the distortion algorithm. A second scale VS is configured to illustrate a distance between pixel A ($x_0$, $y_0$) and the second simulated pixel c ($x_2$, $y_2$), and a second rotate scale VrS is configured to illustrate a change in orientation between pixel A ($x_0$, $y_0$) and the second simulated pixel c ($x_2$, $y_2$). For example, as shown in FIG. 6B, the second scale VS may be calculated by $VS=x_2-x_0$, and the second rotate scale VrS may be calculated by $VrS=y_2-y_0$. In this embodiment, the at least one distortion scale parameter includes, such as but not limited to, the first scale HS, the first rotate scale HrS, the second scale VS, and the second rotate scale VrS.

In a wearable device, a plurality of pixels positioned in the peripheral region of display 102 are distorted, and for each distorted pixel, the distortion scale parameters are calculated for data reconstruction. In the present embodiment, memory 116 of the system of display is further configured to store a look-up table. The look-up table is configured to store the first scale HS, the first rotate scale HrS, the second scale VS, and the second rotate scale VrS of each distorted pixel. For a first frame input into display 102, the first scale HS, the first rotate scale HrS, the second scale VS, and the second rotate scale VrS of each distorted pixel are calculated based on the change in distance and orientation between the distorted pixel and a first pixel adjacent to the distorted pixel in the first direction, as discussed above. The calculated distortion scale parameters are then stored into memory 116. For frame continuously input into a same wearable device, the distortion and reversed distortion for each frame are usually the same, for the distorted pixels in the distorted frames input into display 102 after the first distorted frame, the distortion scale parameters of each distorted pixel may be extracted from the look-up table directly without calculation to improve the efficiency of display.

Figure 7:
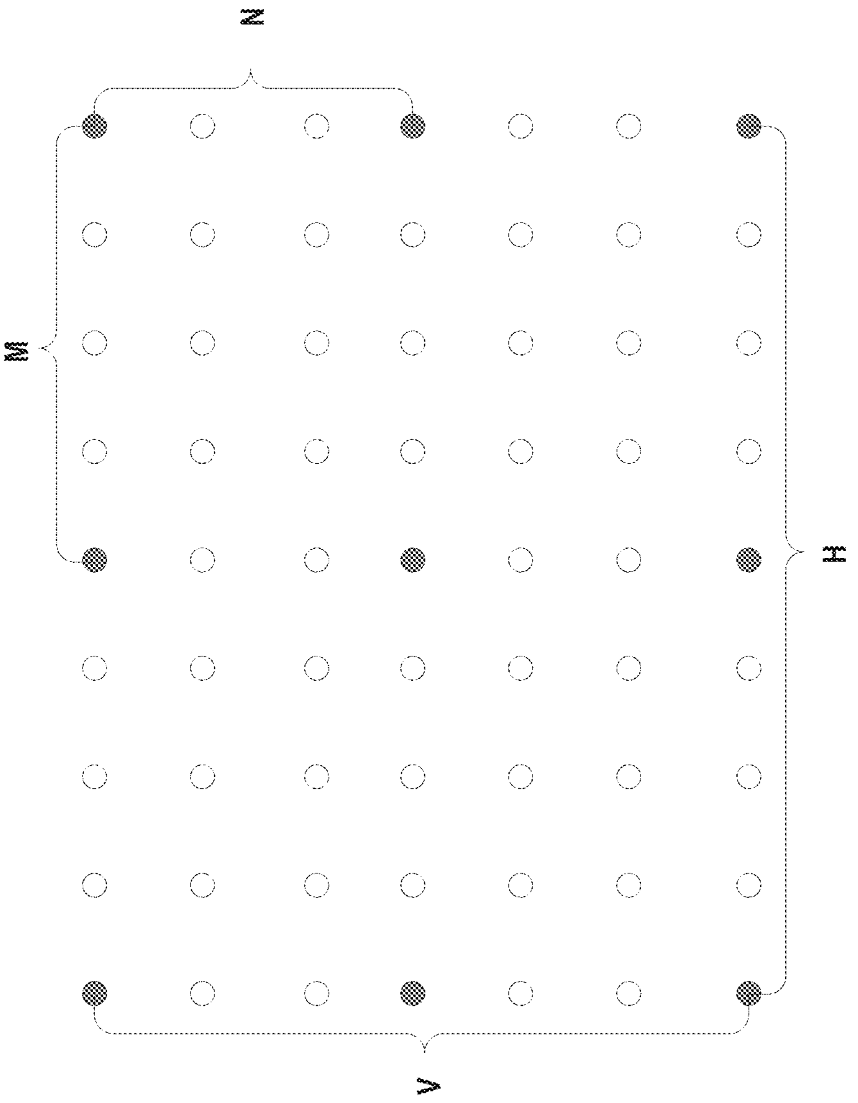
FIG. 7 illustrates a calibration window of the calibration map of the distorted picture in accordance with an embodiment.

Still taking distorted pixel A as an example, after the distortion scale parameters are generated, a calibration window centered on distorted pixel A should be determined as shown in FIG. 7. The calibration window covers distorted pixels centered with distorted pixel A, and the distorted pixels within the calibration window will be used to rebuild the data of distorted pixel A. As the jaggies are generated due to data compression and reconstruction, in the present disclosure, the calibration window may be set bigger than a compression window.

Referring to FIG. 7, the calibrating window centered with distorted pixel A includes a first scope H extending along first direction X, M is a downscale unit of compression of the distorted pixels along the first direction X, then first scope H could be calculated as: $H=k_1\times HS\times M+1$, where $k_1$ is a first calibrating coefficient. First scope H is closely related to the downscale unit of compression. When the downscale unit M of compression along first direction X increased, first scale H is also increased to match the distortion generated during compression. When the downscale unit M of compression along first direction X decreased, first scale H is also decreased to match the distortion generated during compression. In this way, first scale H could cover the distortion region along first direction X accurately. $k_1$ may be set as needed, the bigger $k_1$ is, the larger first scope H will cover, and the more effective the elimination of jaggies will be. First scope H is always bigger than 1, which means at least one pixel will be covered by the first scope H and used to calibrate the distorted pixel. The bigger $k_1$ is, the more pixels will be covered by the calibration window, and the blurrier the picture quality of pixels within the calibration window will be. There would be a trade-off between the picture quality and the degree of the jaggies. $k_1$ could be set based on the needs of users and the display effect, an exemplary value of $k_1$ is 2.

Referring to FIG. 7, the calibrating window further includes a second scope V extending along second direction Y, N is a downscale unit of compression of the distorted pixel along second direction Y, then second scope V could be calculated as: $V=k_2\times VS\times N+1$, where $k_2$ is a second calibrating coefficient and could be set based on the needs of users and the display effect, an exemplary value of $k_2$ is 2, which is equal to $k_1$. The second scope V is closely related to the downscale unit of compression. When the downscale unit N of compression along first direction X increased, first scale H is also increased to match the distortion generated during compression. When the downscale unit N of compression along first direction X decreased, first scale H is also decreased to match the distortion generated during compression. In this way, first scale H could cover the distortion region along the first direction X accurately.

In other embodiments, for example, in a three-dimensional color space, the calibration window may also be three-dimensional, and a third direction Z and a corresponding third scope may be used in the calibration window (not shown in the figures). The present embodiments are used to illustrate the present disclosure and should not be construed as a limitation of the present disclosure.

Figure 8A:
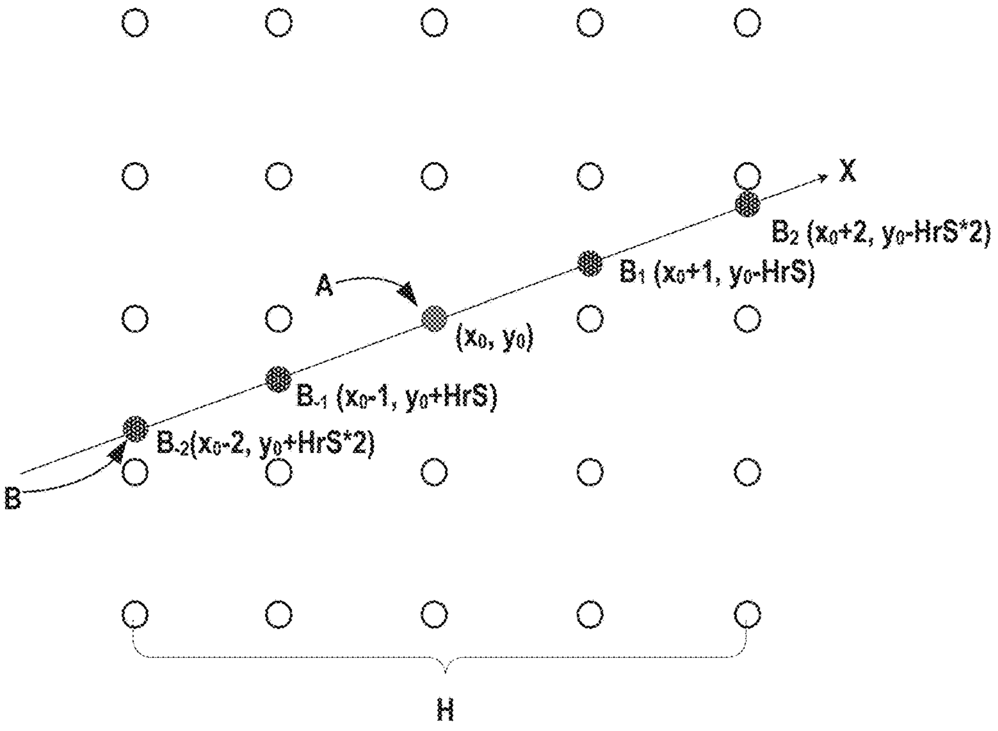
FIG. 8A illustrates a plurality of simulated pixels along the first direction of the distorted picture in accordance with an embodiment.

Referring to FIG. 8A, processor 114 is further configured to calculate a calibrated coordinate position of the at least one simulated pixel along first direction X within first scope H. The at least one simulated pixel is not actual pixels that exist in the picture but simulated to illustrate the distortion along the first direction of the picture. For example, in the present embodiment, a plurality of simulated pixels B centered around distorted pixel A ($x_0$, $y_0$) are generated along first direction X. The calibrated coordinate position of an ith simulated pixel B within the first scope H is ($x_1$, $y_1$), where i represents the shift between the distorted pixel A ($x_0$, $y_0$) and the ith simulated pixel B ($x_1$, $y_1$), i may be an integer other than 0. For example, i could be −2, −1, 1, 2, etc. The calibrated coordinate position of the ith simulated pixel B ($x_1$, $y_1$) may be generated by $x_i=x_0+i$, and $y_1=y_0+i\times HrS$. Referring to FIG. 8A, $x_i$ represents the shifts between the ith simulated pixel B ($x_i$, $y_i$) and the distorted pixel A ($x_0$, $y_0$) along first direction X, and $y_i$ represents the change in orientation between the ith simulated pixel B ($x_i$, $y_i$) and the distorted pixel A ($x_0$, $y_0$) along first direction X. For example, in FIG. 8A, the coordinate position of a second simulated pixel $B_2$ along first direction X is ($x_0$+2, $y_0$−2HrS), the coordinate position of a second simulated pixel $B_{-1}$ along the first direction is ($x_0$−1, $y_0$+HrS), etc. The calibrated coordinate position of the ith simulated pixel B ($x_i$, $y_i$) may be calculated by other approaches as long as the distortion between ith simulated pixel B ($x_i$, $y_i$) and distorted pixel A ($x_0$, $y_0$) can be illustrated accurately.

Figure 9A:
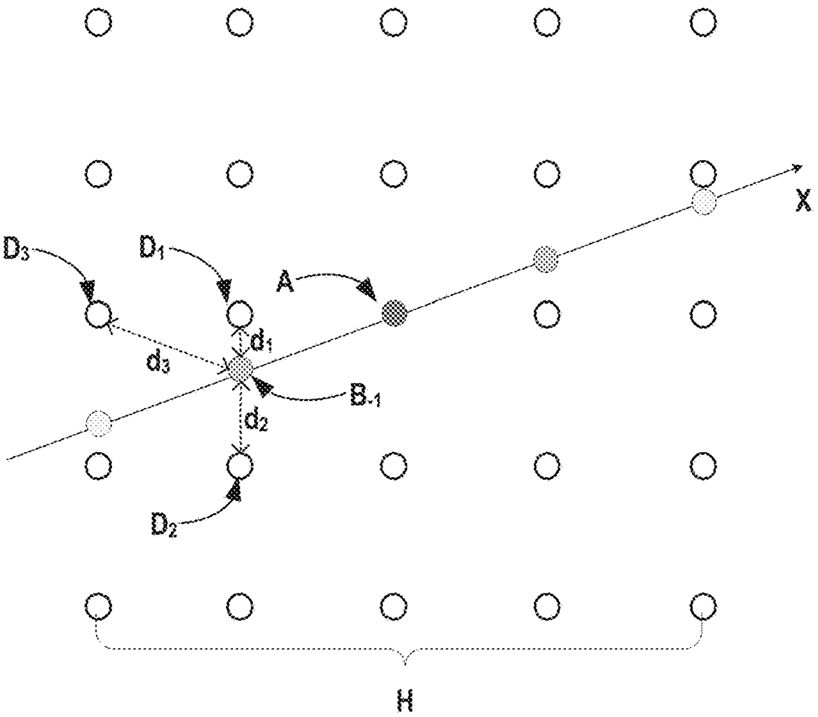
FIG. 9A illustrates greyscale values of the plurality of simulated pixels in FIG. 9A in accordance with an embodiment.

After the coordinate position of simulated pixels B the first direction X within first scope H is determined, the greyscale value for simulated pixels B within the calibrating window is calculated. In the present embodiment, linear interpolation is processed based on greyscale values of distorted pixels adjacent to simulated pixel B, and a distance between simulated pixel B and the pixel around simulated pixel B is less than 1. Referring to FIG. 9A, taking a simulated pixel $B_t$ as an example, in the distorted picture, six pixels are located around simulated pixel $B_1$, in which only two of them have a distance that less than 1 from simulated pixel $B_1$, i.e., a first distorted pixel $D_1$ and a second distorted pixel $D_2$. A first distance $d_1$ between first undistorted pixel $D_1$ and simulated pixel $B_1$ is less than 1, and a second distance $d_2$ between second undistorted pixel $D_2$ and simulated pixel $B_1$ is less than 1. For other undistorted pixels, for example, a third distorted pixel $D_3$, a third distance $d_3$ between third undistorted pixel $D_3$ and simulated pixel $B_1$ is greater than 1. In the present embodiment, the greyscale value of first distorted pixel $D_t$ and second distorted pixel $D_2$ are used in linear interpolation to calculate the greyscale value for the simulated pixels $B_1$. In other embodiments, more than two undistorted pixels may be used in the calculation.

The greyscale value of the distorted pixel A is then calculated based on the greyscale value of simulated pixels along first direction X within first scope H, in this embodiment, i.e., the greyscale value of simulated pixels $B_2$, $B_1$, $B_{-1}$, and $B_{-2}$. In an embodiment, the greyscale value of distorted pixel A is an average of the greyscale value of the simulated pixels along first direction X within first scope H. In other embodiments, before calculating the greyscale value of distorted pixel A, first scope H is rounded down by a rounding function to get a number of simulated pixels within first scope H in case H is not an integer in some embodiment. In other embodiments, Gaussian operations are processed to get the greyscale value of the distorted pixel A. As the distortion along first direction X is accurately reflected by first scale HS and first rotate scale HrS, which are critical parameters for calculating the calibrated greyscale value of distorted pixel A, the distortion along first direction X is fully considered during the reconstruction; thus the jaggies along first direction X can be eliminated in the present display system.

Figure 8B:
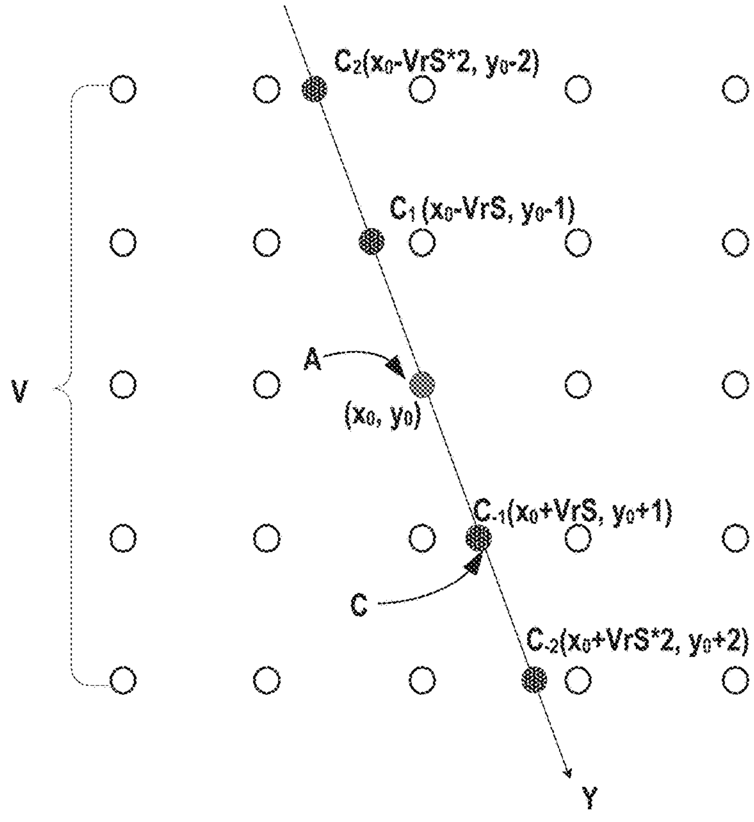
FIG. 8B illustrates a plurality of simulated pixels along the second direction of the distorted picture in accordance with an embodiment.

Referring to FIG. 8B, after the greyscale value of distorted pixel A along first direction X is calibrated, processor 114 is further configured to calculate a calibrated coordinate position of the at least one simulated pixel along second direction Y within second scope V. The simulated pixel are not actual pixels that exist in the picture but simulated to illustrate the distortion along second direction Y of the picture. For example, in the present embodiment, a plurality of simulated pixels C centered around distorted pixel A ($x_0$, $y_0$) are generated along second direction Y. The calibrated coordinate position of an jth simulated pixel C within second scope V is ($x_j$, $y_j$), where j represents the shift between distorted pixel A ($x_0$, $y_0$) and the jth simulated pixel B ($x_j$, $y_j$), j may be an integer other than 0, for example, j could be −2, −1, 1, 2, etc. The calibrated coordinate position of the jth simulated pixel C ($x_j$, $y_j$) may be generated by $x_j=x_0+j\times VrS$, and $y_j=y_0+j$. Referring to FIG. 8B, $x_j$ represents the shifts between the jth simulated pixel C ($x_j$, $y_j$) and distorted pixel A ($x_0$, $y_0$) along the second direction Y, and y; represents the change in orientation between the jth simulated pixel C ($x_j$, $y_j$) and distorted pixel A ($x_0$, $y_0$) along second direction Y. For example, in FIG. 8B, the coordinate position of a second simulated pixel $C_2$ along second direction Y is ($x_0$−2VrS, $y_0$−2), the coordinate position of a second simulated pixel $C_{-1}$ along the first direction is ($x_0$+VrS, $y_0$+1), etc. The calibrated coordinate position of the jth simulated pixel C ($x_1$, $y_j$) may be calculated by other approaches as long as the distortion between the jth simulated pixel C ($x_j$, $y_j$) and distorted pixel A ($x_0$, $y_0$) can be illustrated accurately.

Figure 9B:
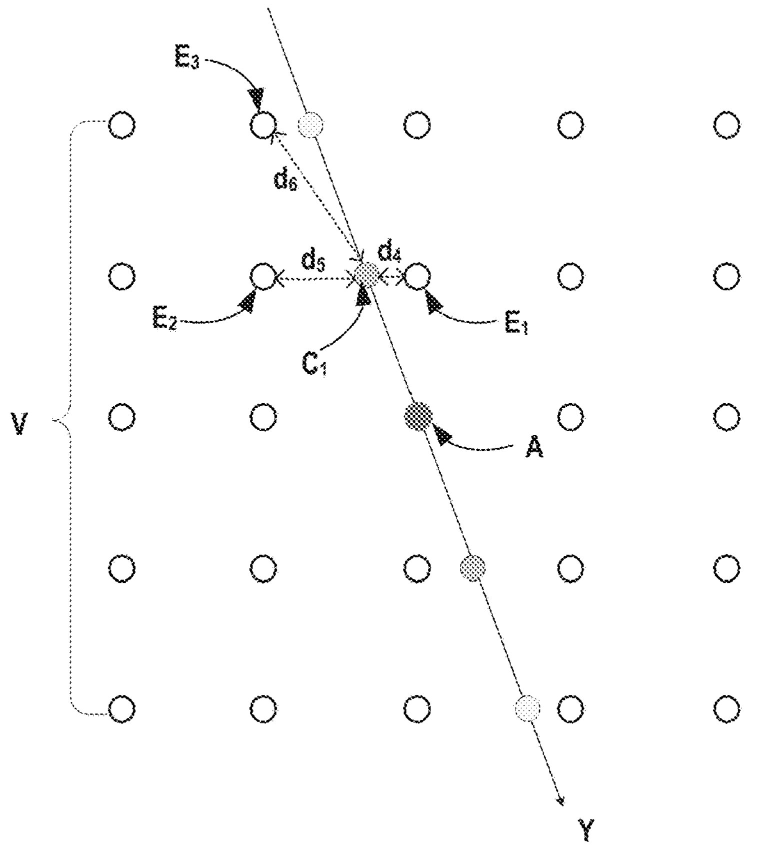
FIG. 9B illustrates greyscale values of the plurality of simulated pixels in FIG. 9B in accordance with an embodiment.

After the coordinate position of simulated pixels C along second direction Y within second scope V is determined, the greyscale value for simulated pixels C within the calibrating window is calculated. In the present embodiment, linear interpolation is processed based on greyscale values of calibrated pixel adjacent to simulated pixel C, and a distance between simulated pixel C and the pixels around simulated pixel C is less than 1. Referring to FIG. 9B, taking a simulated pixel $C_1$ as an example, in the distorted picture, six pixels are located around simulated pixel $C_1$, in which only two of them has a distance that the less than 1 from simulated pixel $C_1$, i.e., a first distorted pixel $E_1$ and a second distorted pixel $E_2$. A first distance $d_4$ between first undistorted pixel $E_1$ and simulated pixel $C_i$ is less than 1, and a second distance $d_5$ between second distorted pixel $E_2$ and simulated pixel $C_i$ is less than 1. For other distorted pixels, for example, a third distorted pixel $E_3$, a third distance $d_6$ between third distorted pixel $E_3$ and simulated pixel $C_1$ is greater than 1. In the present embodiment, the greyscale value of first undistorted pixel $E_1$ and second distorted pixel $E_2$ are used in linear interpolation to calculate the greyscale value for simulated pixels $C_1$. In other embodiments, more than two undistorted pixels may be used in the calculation.

The greyscale value of distorted pixel A is then calculated based on the greyscale value of simulated pixels along second direction Y within second scope V, in this embodiment, i.e., the greyscale value of simulated pixels $C_2$, $C_1$, $C_{-1}$, and $C_{-2}$. In an embodiment, the greyscale value of distorted pixel A is an average of the greyscale value of the simulated pixels along second direction Y within second scope V. In another embodiment, before calculating the greyscale value of distorted pixel A, second scope V is rounded down by a rounding function to get a number of simulated pixels within second scope V in case H is not an integer in some embodiment. In other embodiments, Gaussian operations are processed to get the greyscale value of distorted pixel A. As the distortion along first direction X is accurately reflected by the first scale HS and first rotate scale HrS, which are critical parameters for calculating the calibrated greyscale value of distorted pixel A, the distortion along first direction X is fully considered during the reconstruction; thus the jaggies along first direction X can be eliminated in the present display system.

Figure 10:
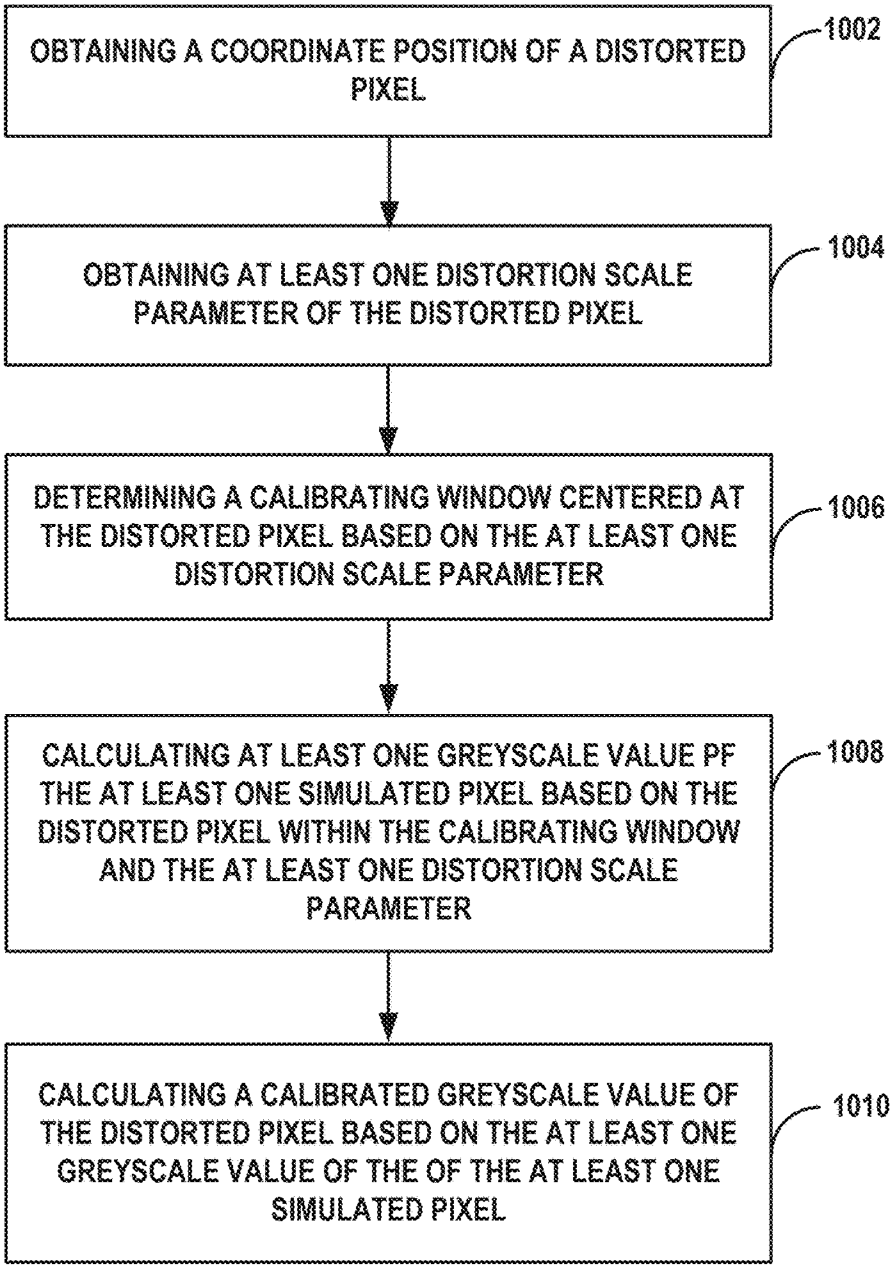
FIG. 10 illustrates a flow chart of a method for calibrating pixel data in a display panel in accordance with an embodiment.

FIG. 10 illustrates a flow chart of method 1000 for calibrating distorted pixels in a display panel in accordance with an embodiment. It will be described with reference to the above figures, such as FIGS. 6A-9B. However, any suitable circuit, logic, unit, or module may be employed. The method can be performed by any suitable circuit, logic, unit, or module that can comprise hardware (e.g., circuitry, dedicated logic, programmable logic, microcode, etc.), software (e.g., instructions executing on a processing device), firmware, or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Starting at 1002, a coordinate position of the distorted pixels is obtained from the input device. For a certain pixel, the coordinate position of the pixel after distortion is the same as its coordinate position before distortion. The undistorted coordinate position and greyscale value of each pixel are input into processor 114 or control logic 104 through an input device. The coordinate position of each distorted pixel may be obtained from the input device as needed.

At 1004, at least one distortion scale parameter of the distorted pixel is obtained. The at least one distortion scale parameter is configured to represent the changes in distance and orientation along at least one direction centered at the distorted pixel. In the present disclosure, two directions are illustrated. In first direction X, first scale HS is configured to illustrate a change in distance between the distorted pixel and the first pixel adjacent to the distorted pixel, and first rotate scale HrS is configured to illustrate a change in orientation between the distorted pixel and the pixel adjacent to the distorted pixel. In second direction Y, second scale VS configured to illustrate a change in distance between the distorted pixel and the first pixel adjacent to the distorted pixel, and second rotate scale VrS configured to illustrate a change in orientation between the distorted pixel and the pixel adjacent to the distorted pixel.

In a wearable device, a plurality of pixels positioned in the peripheral region of display 102 are distorted, and for each distorted pixel, the distortion scale parameters are calculated for data reconstruction. In the present embodiment, first scale HS, first rotate scale HrS, second scale VS, and second rotate scale VrS are calculated for each of the plurality of distorted pixels. In the present embodiment, a look-up table is generated to store first scale HS, first rotate scale HrS, second scale VS, and the second rotate scale VrS of each distorted pixel. For a first frame input into display 102, first scale HS, first rotate scale HrS, second scale VS, and the second rotate scale VrS of each distorted pixel are calculated based on the change in distance and orientation between the distorted pixel and the second pixel adjacent to the distorted pixel in the first direction, as discussed above. The calculated distortion scale parameters are then stored into the look-up table. For frame continuously input into a same wearable device, the distortion and reversed distortion for each frame are usually the same; for the distorted pixel in the distorted frames input into display 102 after the first distorted frame, the distortion scale parameters of each distorted pixel may be extracted from the look-up table directly without calculation to improve the efficiency of display.

At 1006, a calibrating window centered at the distorted pixel based on the at least one distortion scale parameter is determined, the calibrating window comprising a plurality of pixels located along at least one distorted direction. Referring to FIG. 7, the calibrating window centered of each distorted pixel includes first scope H extending along the first direction X and the second scope V extending along second direction Y. The method for determining the first and second scope is detailed above and will not be repeated here. It should be understood that other approaches could be used to determine the calibration window. The present description should not be explained as limitation of the present disclosure. In other embodiments, for example, in a three-dimensional color space, the calibration window may also be three-dimensional. A third direction Z and a corresponding third scope may be used in the calibration window (not shown in the figures). The present embodiments are used to illustrate the present disclosure and should not be construed as a limitation of the present disclosure.

At 1008, the calibrated greyscale value for at least one simulated pixel is calculated based on the distorted pixel within the calibrating window and the at least one distortion scale parameter, and then at 1010, the calibrated greyscale value of the distorted pixel is calculated based on the calibrated greyscale value of the of the at least one simulated pixel. The method for determining the first and second scope is detailed above and will not be repeated here.

The above detailed description of the disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

What is claimed is:

1. A system for calibrating pixel data for a display, comprising:

a display panel having a plurality of pixels; and a processor configured to generate calibrated display data for driving the display panel by:

receiving a distorted frame comprising compressed pixel data for the display panel;

for distorted pixel data associated with a pixel in the display panel:

obtaining a coordinate position of the distorted pixel data in the distorted frame;

obtaining distortion scale parameters comprising a first scale representing a change in distance between the distorted pixel data and first adjacent pixel data in a first direction after distortion, and a first rotate scale representing a change in orientation between the distorted pixel data and the first adjacent pixel data after distortion;

determining a calibrating window centered at the distorted pixel data, the calibrating window comprising a first scope extending along the first direction, wherein the first scope is adaptively determined based on the first scale and a downscale unit used to compress the pixel data along the first direction, and increases as the first scale or the downscale unit increases;

determining positions of simulated pixels within the first scope along a distorted direction determined based on the first rotate scale;

calculating greyscale values of the simulated pixels by interpolation based on greyscale values of distorted pixel data adjacent to the simulated pixels;

calculating a calibrated greyscale value of the distorted pixel data based on the greyscale values of the simulated pixels; and generating calibrated display data based on the calibrated greyscale value.

2. The system of claim 1, wherein obtaining the first scale and the first rotate scale comprises:

determining, based on a distortion algorithm, a coordinate position of the first adjacent pixel data after distortion from a coordinate position of the corresponding adjacent pixel data before distortion.

3. The system of claim 2, wherein the coordinate position of the distorted pixel data associated with the pixel after distortion is $(x_0, y_0)$; and the coordinate position of the first adjacent pixel data after distortion is $(x_1, y_1)$; wherein the first scale is HS, the first rotate scale is HrS, and the HS and HrS are calculated by:

$$HS = x_1 - x_0$$

$$HrS = y_1 - y_0.$$

4. The system of claim 3, further comprising a memory configured to store a look-up table, wherein the look-up table is configured to store the first scale HS and the first rotate scale HrS for distorted pixel data of pixels in the display panel.

5. The system of claim 4, wherein for subsequent distorted frames input into the display, the first scale HS and the first rotate scale HrS are extracted from the look-up table.

6. The system of claim 3, wherein the first scope H is determined according to:

$$H = k_1 \times HS \times M + 1$$

where $k_1$ is a first calibrating coefficient, HS is the first scale, and M is the downscale unit used to compress the pixel data along the first direction.

7. The system of claim 6, wherein $k_1$=2.

8. The system of claim 6, wherein determining the positions of the simulated pixels comprises calculating a coordinate position ($x_i$, $y_i$) of an ith simulated pixel within the first scope by:

$$x_i = x_0 + i$$

$$y_i = y_0 + i \times HrS$$

where i is an integer other than 0.

9. The system of claim 8, wherein calculating the at least one greyscale values of the simulated pixels comprises:

processing linear interpolation based on greyscale values of the distorted pixel data adjacent to the simulated pixels, wherein a distance between a simulated pixel and the adjacent distorted pixel data is less than 1.

10. The system of claim 9, wherein the calibrated greyscale value for the distorted pixel data is calculated based on the greyscale values of the simulated pixels along the first direction within the first scope.

11. The system of claim 10, wherein the calibrated greyscale value for the distorted pixel data is an average of the greyscale values of the simulated pixels along the first direction within the first scope.

12. The system of claim 10, wherein the distortion scale parameters further comprise:

a second scale representing a change in distance between the distorted pixel data and second adjacent pixel data in a second direction after distortion; and a second rotate scale representing a change in orientation between the distorted pixel data and the second adjacent pixel data after distortion.

13. The system of claim 12, wherein the coordinate position of the distorted pixel data associated with the pixel after distortion is ($x_0$, $y_0$);

a coordinate position of the second adjacent pixel data after distortion is ($x_2$, $y_2$);

the second scale is VS; and the second rotate scale is VrS, wherein the VS and VrS are calculated by $$VS = x_2 - x_0$$

$$VrS = y_2 - y_0.$$

14. The system of claim 13, further comprising a memory configured to store a look-up table, wherein the look-up table is configured to store the second scale and the second rotate scale for distorted pixel data of pixels in the display panel.

15. The system of claim 14, wherein for subsequent distorted frames input into the display, the second scale and the second rotate scale are extracted from the look-up table.

16. The system of claim 13, wherein the calibrating window comprises a second scope extending along the second direction, and the second scope is adaptively determined based on both the second scale and a downscale unit used to compress the pixel data along the second direction.

17. The system of claim 16, wherein the second scope is determined according to:

$$V = k_2 \times VS \times N + 1$$

wherein V is the second scope, $k_2$ is a second calibrating coefficient, VS is the second scale, and N is the downscale unit used to compress the pixel data along the second direction.

18. The system of claim 17, wherein positions of simulated pixels within the second scope are determined along a direction based on the second rotate scale.

19. The system of claim 18, wherein greyscale values of the simulated pixels within the second scope are calculated by linear interpolation based on greyscale values of distorted pixel data adjacent to the simulated pixels.

20. A method for calibrating pixel data for a display panel having a plurality of pixels, the method comprising:

receiving a distorted frame comprising compressed pixel data for the display panel;

obtaining, for distorted pixel data associated with a pixel in the display panel, a coordinate position of the distorted pixel data in the distorted frame;

obtaining distortion scale parameters comprising a first scale representing a change in distance between the distorted pixel data and first adjacent pixel data in a first direction after distortion, and a first rotate scale representing a change in orientation between the distorted pixel data and the first adjacent pixel data after distortion;

determining a calibrating window centered at the distorted pixel data, the calibrating window comprising a first scope extending along the first direction, wherein the first scope is adaptively determined based on the first scale and a downscale unit used to compress the pixel data along the first direction, and increases as the first scale or the downscale unit increases;

determining positions of simulated pixels within the first scope along a distorted direction determined based on the first rotate scale;

calculating greyscale values of the simulated pixels by interpolation based on greyscale values of distorted pixel data adjacent to the simulated pixels;

calculating a calibrated greyscale value of the distorted pixel data based on the greyscale values of the simulated pixels; and generating calibrated display data based on the calibrated greyscale value.

* * * * *